United States Patent [19]

Kaneko

[11] Patent Number: 4,946,611

[45] Date of Patent: Aug. 7, 1990

[54] REFRIGERATOR OIL CONTAINING FLUORINATED SILOXANE COMPOUNDS

[75] Inventor: Masato Kaneko, Ichihara, Japan

[73] Assignee: Idemitsu Kosan Co., Ltd., Tokyo, Japan

[21] Appl. No.: 280,959

[22] Filed: Dec. 7, 1988

[30] Foreign Application Priority Data

Dec. 11, 1987 [JP] Japan ............................ 62-312357

[51] Int. Cl.$^5$ ................ C10M 105/56; C10M 105/76
[52] U.S. Cl. .................................. 252/49.6; 252/58; 252/68; 252/78.3
[58] Field of Search ............... 252/58, 49.6, 68, 78.3

[56] References Cited

U.S. PATENT DOCUMENTS

| | | | |
|---|---|---|---|
| 2,582,799 | 1/1952 | Sauer | 252/49.6 X |
| 2,892,859 | 6/1959 | McBee | 252/49.6 X |
| 2,981,746 | 4/1961 | Cohen | 252/49.6 X |
| 2,983,711 | 5/1961 | Gordon | 252/49.6 X |
| 3,148,201 | 9/1964 | Fassnacht | 252/49.6 X |
| 3,664,985 | 5/1972 | Britt | 252/49.6 X |
| 4,324,671 | 4/1982 | Christian | 252/49.6 |

*Primary Examiner*—William R. Dixon, Jr.
*Assistant Examiner*—James M. Hunter, Jr.
*Attorney, Agent, or Firm*—Antonelli, Terry, Stout & Kraus

[57] ABSTRACT

A refrigerator oil which comprises at least one of the fluorinated compounds represented by the following general formula:

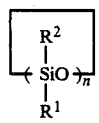

(I)

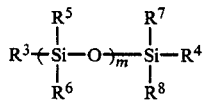

(II)

or

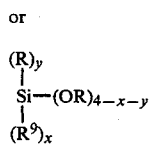
(III)

(all the symbols are as defined in the appended claims).

The refrigerator oil is effectively used as a lubricant for refrigerators, coolers, (particularly car air-conditioners), and heat pumps which use various Flon compounds as refrigerants.

9 Claims, No Drawings

REFRIGERATOR OIL CONTAINING FLUORINATED SILOXANE COMPOUNDS

BACKGROUND OF THE INVENTION

1. Field of the Invention

The present invention relates to a refrigerator oil (refrigerating machine oil), more particularly to a refrigerator oil stable to refrigerants such as various kinds of Flon compounds (fluorine-containing alkane), which comprise specific fluorinated compound, mixtures thereof, or compositions prepared by adding the fluorinated compound to lubricating base oils. This refrigerator oil is also excellent in anti-seizure properties and other properties.

2. Description of the Related Arts

Generally, the properties required to refrigerator oils are stability to refrigerants including Flon, and excellence in lubricating properties such as anti-seizure properties and anti-wear properties. Lately refrigerators have been operated under severe conditions, more concretely, compressors of them have increased in revolution number, or have been invertiblized. In that situation, further improvement in lubricating property has become one of the necessary and inevitable conditions.

To improve the lubricating property (lubricity) of a refrigerator oil, phosphorus compounds such as tricresylphosphate (TCP) or sulfur compounds such as dialkylsulfide have heretofore been compounded with base oils, but they had problems that they saw limitations in improvement in lubricating property, and that they had poor stabilities to refrigerants.

Japanese Patent Application Laid-Open No. 171487/1983 disclosed a low polymer of trifluorochloroethylene, but it was impractical because it was considerably poor in solubility into base soils.

The present inventors have earnestly studied so as to overcome the abovementioned problems of the conventional refrigerator oil, and to develop a refrigerator oil having a high anti-seizure load and an excellent stability to various refrigerators.

SUMMARY OF THE INVENTION

An object of the present invention is to provide a refrigerator oil stable to refrigerants such as various Flon compounds.

Another object of the present invention is to provide a refrigerator oil excellent in anti-seizure properties and anti-wear properties.

Further object of the present invention is to provide a refrigerator oil excellent in miscibility with various refrigerants.

The present invention relates to a refrigerator oil which comprises fluorinated compounds represented by the general formula:

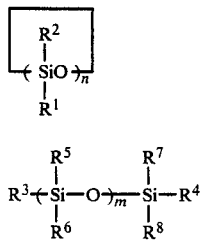

or

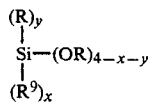

wherein R is an alkyl group having 1 to 3 carbon atoms, an aryl group having 6 to 30 carbon atoms or cycloalkyl group having 6 to 30 carbon atoms, $R^1$ to $R^8$ are independently an alkyl group having 1 to 30 carbon atoms, an aryl group having 6 to 30 carbon atoms, a cycloalkyl group having 6 to 30 carbon atoms, a fluorine-substituted alkyl group having 1 to 30 carbon atoms, a fluorine-substituted aryl group having 1 to 30 carbon atoms or a fluorine-substituted cycloalkyl group having 6 to 30 carbon atoms, and $R^9$ is a fluorine-substituted alkyl group having 1 to 30 carbon atoms, a fluorine-substituted aryl group having 6 to 30 carbon atoms or a fluorine-substituted cycloalkyl group having 6 to 30 carbon atoms provided that at least one of $R^1$ and $R^2$ is a fluorine-containing group, and that at least one of $R^3$ to $R^8$ is a fluorine-containing group, and n is an integer of 3 to 6, m is an integer of 1 to 100, and x and y are integers each satisfying the following expressions:

$$1 \leq x \leq 4, \quad 0 \leq y \leq 3, \quad 0 \leq x+y \leq 4.$$

DESCRIPTION OF PREFERRED EMBODIMENTS

The refrigerator oil of the present invention contains a fluorinated compound represented by either of the above general formulas (I) to (III). Herein the fluorinated compounds represented by the general formula (I) include various kinds. $R^1$ and $R^2$ in the general formula (I) are as per the above description, but at least one of them is a fluorine containing group (a fluorine substituted alkyl group having 1 to 30 carbon atoms, a fluorine-substituted aryl group having 6 to 30 carbon atoms, or a fluorine substituted cycloalkyl group having 6 to 30 carbon atoms). A preferred example among various alkyl groups having 1 to 30 carbon atoms includes alkyl groups having 1 to 6 carbon atoms (methyl group, ethyl group, propyl group, butyl group and the like). A preferred example of aryl groups having 6 to 30 carbon atoms includes aryl groups having 6 to 20 carbon atoms (phenyl group, tolyl group, xylyl group, nonylphenyl group dodecylphenyl group and the like). A preferred example of cycloalkyl groups having 6 to 30 carbon atoms includes cycloalkyl groups having 6 to 20 carbon atoms (cyclohexyl group, cycloheptyl group, methylcyclohexyl group, nonylcyclohexyl group and the like). Furthermore, preferred examples of fluorine-substituted alkyl groups having 1 to 30 carbon atoms are fluorine-substituted alklyl groups having 1 to 18 carbon atoms, and concretely, trifluoromethyl group, trifluoroethyl group, trifluoropropyl group, pentafluoropropyl group, trifluorobutyl group, tridecafluorooctyl group, and pentaeicosafluorotetradecyl group. Preferred examples of fluorine substituted aryl group having 6 to 30 carbon atoms are the fluorine-substituted aryl group having 6 to 20 carbon atoms including fluorophenyl group, trifluoromethylphenyl group, trifluoroethylphenyl group, trifluoropropylphenyl group, tridecafluorooctylphenyl group and pentaeicosafluorotetradecylphenyl group. Fluorine-substituted cycloalkyl group having 6 to 30 carbon atoms are preferably fluorine-substituted cycloalkyl groups having 6 to 20 carbon atoms including fluorocyclohexyl group, trifluoromethylcyclohexyl group, trifluoroethylcyclohexyl group, trifluoropropylcyclohexyl group, tridecafluorocyclohexyl group, and pentaeicosafluorotetradecylcycohexyl group. n is an integer of 3 to 6. The typical examples of fluorinated compounds represented by the general formula (I) are 1,3,5-tris(3,3,3-trifluoropropyl)-1,3,5-trimethylcyclotrisiloxane; 1,3,5-tris(3,3,3-trifluoropropyl)-1,3,5-triisododecylcyclotrisiloxane; 1,1,3,3,5,5-hexa(3,3,3-trifluoropropyl)cyclotrisiloxane.

Fluorinated compounds represented by the general formula (II) include various kinds. $R^3$ to $R^8$ in the said formula (II) are the same as defined before, that is, similar to those described on $R^1$ to $R^2$. When m is two or more, each $R^5$ and $R^6$ may be identical or different. However, at least one of $R^3$ to $R^8$ is a fluorine-containing group. m in the general formula (II) is an integer of 1 to 100 (preferably 2 to 50), but generally the fluorine content of $R^3$ and $R^8$, the substitute groups, is preferred to be larger as m becomes larger. A typical example of the fluorine compounds represented by the general formula (II) is polyfluoroalkylsiloxane represented by the general formula (II'):

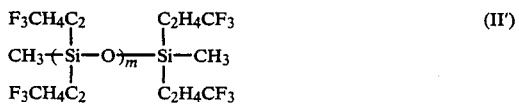

As the commercially available products of the above compound, polyfluoroalkylsiloxane represented by the above formula (II') (m is about 10 to 30) (FL-100, produced by Shinetsu Silicon Co., Ltd.) can be applied.

An example of fluorinated compounds represented by the general formula (II) when m is 2 is a fluorinated compound represented by the general formula (II''):

In the general formula (II''), $R^3$ to $R^8$ are the same as defined above, and at least one of them is fluorine-containing group. Among them, $R^3$ and $R^4$ are preferably no fluorine-containing group (including an alkyl group having 1 to carbon 30 atoms, an aryl group having 6 to 30 carbon atoms or a cycloalkyl group having 6 to 30 carbon atoms). Examples of the fluorine-containing compounds represented by this general formula (II'') are 3-(3,3,3-trifluoropropyl)-1,1,1,3,5,5,5-heptamethyltrisiloxane and 3,3-di(3,3,3-trifluoropropyl)-1,1,1,5,5,5-hexamethyltrisiloxane.

Further, the fluorinated compounds represented by the general formula (III) vary with the numbers of x and y. For example, when x=1, and y=1, the general formula (III) shows fluorinated compounds represented by the formula:

(wherein R and $R^9$ are the same as defined above. However, three Rs may be identical or different.), and when x=1, and y=0, the general formula (III) shows the fluorinated compounds represented by the formula:

(wherein R and $R^9$ are the same as defined above. However, three Rs may be identical or different.) Therein $R^9$ is, as described above, a fluorine-containing group (a fluorine-substituted alkyl group having 1 to 30 carbon atoms, a fluorine-substituted alkyl group having 6 to 30 carbon atoms, or a fluorine-substituted cycloalkyl group having 6 to 30 carbon atoms), and more concretely, identical as the groups shown by $R^1$ and $R^2$ described before.

Examples of fluorinated compounds represented by the general formula (III) are 3,3,3-trifluoropropyltrimethoxysilane, 3,3,3-trifluoropropyl-tridecaoxysilane, and dimethoxymethyl-3,3,3-trifluoropropylsilane.

The refrigerator oil of the present invention contains at least one kind of the fluorinated compounds represented by the general formulas (I) to (III), and the content thereof in the refrigerator oil is not critical.

The refrigerator oil of the present invention may comprise the fluorinated compounds alone represented by the above general formulas (I) to (III), or may contain the said fluorinated compounds as the main component, or further it may contain the said fluorinated compounds as additive component in small amount.

Usually, the ratio of fluorine compounds represented by the above general formulas (I) to (III) in refrigerator oil should be at least 0.0005% by weight, and it should be selected properly from the range of 0.0005 to 100% by weight according to the purpose. However, the ratio is preferably set in the range of 0.005 to 10 parts by weight from the viewpoint of solubility or economical efficiency to 100 parts by weight of the base oil for refrigerator oil. If the amount of fluorinated compound added is too small, the aimed effect cannot appear sufficiently.

For the refrigerator oil of the present invention, mineral oils or synthetic oils independently or mixture of these two can be used as base oils. The properties of the said base oils are not critical, but usually the kinematic viscosity at 40° C. is 5 to 1000 cSt, preferably 7 to 500 cSt, and more preferably 10 to 300 cSt. Herein when the kinematic viscosity is under 5 cSt, such problems occur that oil consumption by evaporation becomes large, that circulating oil increases, and the sealing properties are poor.

Representatives examples of mineral oils used here as the base oil are a distillate oil obtained by atmospheric distillation of paraffin base crude oils, intermediate base crude oils or naphthene base crude oils, or by vacuum distillating the residual oil from the atmospheric distillation, of refined oils obtained by purifying the above according to the ordinary method, that is, solvent-refined oil, hydrogen refined oil, dewaxed oil and clay-treated oil.

Representative examples of the synthetic oils are alkylbenzene, alkyldiphenyl, poly-α-olefin, esters (hindered ester, dibasic acid ester, polyol ester, phosphate), polyethers (polyphenylether, polyglycolether), and silicone oil.

As the base oil of the refrigerator oil of the present invention, the abovementioned mineral oils or synthetic oils can be used. To consider the solubility or stability to slightly soluble refrigerant, however, synthetic oil is preferable, and more preferably are alkylbenzene, alkyldiphenyl, ester and polyether.

In the refrigerator oil of the present invention, if necessary, it is also effective to compounding a proper amount of antiwear agents including tricresylphosphate (TCP), chlorine-capturing agents including phenylglycidylether (PGE), antioxidants such as alpha-naphthylamine, 2,6-di-tertbutyl-p-crezol(DBPC), metal deactivator including benzotriazol and deforming agents including silicone oil.

As described above, the refrigerator oil of the present invention is stable to various refrigerants, for example, Flon-22 (monochlorodifluoromethane), Flon-23 (trifluoromethane), Flon-123 (1,1-dichloro-2,2,2-trifluoroethane), Flon-134a (1,1,1,2-tetrafluoroethane), Flon-134 (1,1,2,2-tetrafluoroethane) and Flon-152a (1,1-difluoroethane), and is excellent in miscibility and stability to the refrigerants usually regarded as insoluble refrigerant. Moreover, the refrigerator oil of the present invention is high in anti-seizure properties and anti-wear properties, which can lessen the oil consumption by evaporation and decrease the amount of circulating oil.

Accordingly, the refrigerator oil of the present invention is effectively used as a lubricant for refrigerators, coolers, (particularly car air-conditioners), and heat pumps which use various Flon compounds as refrigerants.

The present invention is described in greater detail with reference to the following examples. The evaluation in the following Examples and Comparative Examples were performed by the following methods.

Thermostability Test (Shield Tube Test)

A 2:1 (by weight) mixture of a sample and flon-22 was placed in a glass tube along with a catalyst of iron, copper and aluminum and sealed. After heating at 175° C. for 720 hours, the appearance and the formation of precipitate were examined.

Seizure Test (Falex Seizure Test)

According to ASTM D 3233, seizure load (pounds) were determined with the condition that blow amount of Flon-22 was 10 liters/hour.

Wearing Test (Falex Wearing Test)

Wear amount was measured with the condition of blow amount of Flon-22: 10 liters/hour, load: 300 pounds, period: 2 hours.

Miscibility (Two Phase Separation Temperature)

A sample and Flon-22 were mixed in a ratio of 2 to 8 (by weight) and a temperature at which the mixture was separated into two phases was measure. x shows two phases separation temperature of more than 20° C., and O shows that separation was not observed at temperature of more than 20° C.

EXAMPLES 1 to 10 AND COMPARATIVE EXAMPLE 1 to 6

Compositions were prepared with the mineral oil, poly-α-olefin, alkylbenzene, hindered ester or polyglycol in Table 1 as the base oil, employing the fluorinated silicone of the general formula (II) (in the formula m is about 12 (average), kinematic viscosity at 40° C: 80 cSt, viscosity index: 210) as fluorinated compound, and evaluated according to the above methods. The results are shown in Tables 2 and 3.

EXAMPLES 11 to 27 AND COMPARATIVE EXAMPLES 7 to 10

Refrigerator oils were prepared by compounding the mineral oil, alkylbenzene, polyglycol and fluorinated compounds shown in Table 4 in a prescribed amount, and evaluated according to the above methods. The results are shown in Table 4.

TABLE 1

| Sample No. | Type of Sample | Kinematic Viscosity at 40° C. (cSt) | Viscosity Index |
|---|---|---|---|
| I | Naphthene base mineral oil | 92 | 43 |
| II | Poly α-olefin | 65 | 115 |
| III | Alkylbenzene | 56 | less than 0 |
| IV | Hindered ester | 74 | 128 |
| V | Polyglycol | 221 | 212 |

TABLE 2

| No. | Sample No. | Ratio of Fluorinated Silicone Added (% by weight) | Falex Seizure Test Seizure Load (pounds) |
|---|---|---|---|
| Comparative Example 1 | I | 0 | 430 |
| Comparative Example 2 | II | 0 | 270 |
| Comparative Example 3 | III | 0 | 250 |
| Comparative Example 4 | IV | 0 | 600 |
| Comparative Example 5 | V | 0 | 650 |
| Comparative Example 6 | I | 1* | 650 |
| Example 1 | I | 0.2 | 850 |
| Example 2 | II | 0.2 | 820 |
| Example 3 | III | 0.2 | 810 |
| Example 4 | IV | 0.2 | 910 |
| Example 5 | V | 0.2 | 930 |
| Example 6 | V | 0.5 | 1000 |
| Example 7 | III | 0.2** | 810 |
| Example 8 | V | 0.2** | 930 |
| Example 9 | — | 100 | 1040 |
| Example 10 | — | 100** | 1080 |

*Tricresylphosphate (TCP) was added instead of fluorinated silicone.
**A fluorinated silicone having m in the general formula (I'I) of about 27 (average), kinematic viscosity at 40° C. of 210 cSt, and viscosity index of 220, was employed.

TABLE 3

| No. | Sample No. | Ratio of Fluorinated Silicone Added (% by weight) | Shield Tube Test Appearance | Precipitate |
|---|---|---|---|---|
| Example 3 | III | 0.2 | Good | None |
| Example 4 | IV | 0.2 | Good | None |
| Example 5 | V | 0.2 | Good | None |
| Example 6 | V | 0.5 | Good | None |
| Comparative Example 6 | I | 1* | Yellow-brown | Precipitated |

TABLE 3-continued

| No. | Sample No. | Ratio of Fluorinated Silicone Added (% by weight) | Shield Tube Test | |
|---|---|---|---|---|
| | | | Appearance | Precipitate |
| Example 7 | III | 0.2** | Good | None |
| Example 9 | — | 100 | Good | None |

*Tricresylphosphate (TCP) was added instead of fluorinated silicone.
**A fluorinated silicone having m in the general formula (I') of about 27 (average), kinematic viscosity at 40° C. at 210 cSt, and viscosity index of 220, was employed.

TABLE 4

| No. | Composition* (%) | | | | | | | Thermostability | Lubricity | | Miscibility |
|---|---|---|---|---|---|---|---|---|---|---|---|
| | A | B | C | D | E | F | G | | Seizure Load (pounds) | Wear Amount (mg) | |
| Example 11 | 100 | — | — | — | — | — | — | Good | 1100 | <1 | |
| Example 12 | — | 100 | — | — | — | — | — | Good | 1050 | <1 | |
| Example 13 | — | — | 100 | — | — | — | — | Good | 1150 | <1 | |
| Example 14 | — | — | — | 100 | — | — | — | Good | 1100 | <1 | |
| Example 15 | 50 | — | — | 50 | — | — | — | Good | 1100 | <1 | |
| Example 16 | 1 | — | — | — | 99 | — | — | Good | 800 | 1 | |
| Example 17 | — | 1 | — | — | 99 | — | — | Good | 750 | 1 | |
| Example 18 | — | — | 1 | — | 99 | — | — | Good | 850 | 1 | |
| Example 19 | — | — | — | 1 | 99 | — | — | Good | 800 | 1 | |
| Example 20 | 1 | — | — | — | — | 99 | — | Good | 750 | 1 | |
| Example 21 | — | 1 | — | — | — | 99 | — | Good | 750 | 1 | |
| Example 22 | — | — | 1 | — | — | 99 | — | Good | 700 | 1 | |
| Example 23 | — | — | — | 1 | — | 99 | — | Good | 850 | 1 | |
| Example 24 | 1 | — | — | — | — | — | 99 | Good | 800 | 1 | |
| Example 25 | — | 1 | — | — | — | — | 99 | Good | 800 | 1 | |
| Example 26 | — | — | 1 | — | — | — | 99 | Good | 850 | 1 | |
| Example 27 | — | — | — | 1 | — | — | 99 | Good | 800 | 1 | |
| Comparative Example 7 | — | — | — | — | 100 | — | — | Good | 400 | 13 | X |
| Comparative Example 8 | — | — | — | — | — | 100 | — | Good | 250 | Seizured | |
| Comparative Example 9 | — | — | — | — | — | — | 100 | Good | 550 | 25 | |
| Comparative Example 10 | Tricresylphosphate(1) | | | 99 | — | — | — | Good | 650 | 10 | X |

A: 1,3,5-tris(3,3,3-trifluoropropyl)-1,3,5-trimethylcyclosiloxane
B: 3-(3,3,3-trifluoropropyl)-1,1,1,3,5,5,5-heptamethyltrisiloxane
C: Dimethoxymethyl-3,3,3-trifluoropropylsilane
E: paraffin base mineral oil, kinematic viscosity at 40° C.: 56 cSt, sulfur content: not more than 0.01% by weight
F: aklylbenzene, kinematic viscosity at 40° C: 32 cSt
G: polyglycol, kinematic viscosity at 40° C: 24 cSt

What is claimed is:

1. A refrigerator oil which comprises at least one of the fluorinated compounds represented by the following general formula:

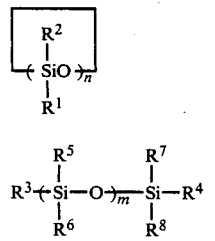

(I)

(II)

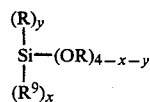

(III)

or wherein R is an alkyl group having 1 to 30 carbon atoms, an aryl group having 6 to 30 carbon atoms or cycloalkyl group having 6 to 30 carbon atoms, $R^1$ to $R^8$ are independently an alkyl group having 1 to 30 carbon atoms, an aryl group having 6 to 30 carbon atoms, a cycloalkyl group having 6 to 30 carbon atoms, a fluorine-substituted alkyl group having 1 to 30 carbon atoms, a fluorine-substituted aryl group having 1 to 30 carbon atoms or a fluorine-substituted cycloalkyl group having 6 to 30 carbon atoms, and $R^9$ is a fluorine-substituted alkyl group having 1 to 30 carbon atoms, a fluorine-substituted aryl group having 6 to 30 carbon atoms, or a fluorine-substituted cycloalkyl group having 6 to 30 carbon atoms provided that at least one of $R^1$ and $R^2$ is a fluorine-containing group; and that at least one of $R^3$ to $R^8$ is a fluorine-containing group; and n is an integer of 3 to 6, m is an integer of 1 to 100, and x and y are integers each satisfying the following expressions:

$$1 \leq x \leq 4, \ 0 \leq y \leq 3, \ 0 \leq x+y \leq 4.$$

2. The refrigerator oil as claimed in claim 1, wherein the fluorinated compound represented by the general formula (I) is at least one compound selected from the group consisting of 1,3,5-tris(3,3,3-trifluoropropyl)-1,3,5-trimethylcyclotrisiloxane; 1,3,5-tris(3,3,3-trifluoropropyl)-1,3,5-triisododecylcyclotrisiloxane and 1,1,3,3,5,5-hexa(3,3,3-trifluoropropyl)cyclotrisiloxane.

3. The refrigerator oil as claimed in claim 1, wherein the fluorinated compound represented by the general formula (II) is at least one compound represented the following general formula;

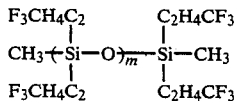
(II')

(in which m is the same as defined above).

4. The refrigerator oil as claimed in claim 1, wherein the fluorinated compound represented by the general formula (II) is at least one compound represented the following general formula;

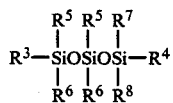
(II'')

(in which $R^3$ to $R^8$ are the same as defined above).

5. The refrigerator oil as claimed in claim 4, wherein the fluorinated compound represented by the general formula (II'') is at least one compound selected from the group consisting of 3-(3,3,3-trifluoropropyl)-1,1,1,3,5,5,5-heptamethyltrisiloxane and 3,3-di(3,3,3-trifluoropropyl)-1,1,1,5,5,5,-hexamethyltrisiloxane.

6. The refrigerator oil as claimed in claim 1, wherein the fluorinated compound represented by the general formula (III) is at least one compound selected from the group consisting of 3,3,3-trifluoropropyltrimethoxysilane, 3,3,3-trifluoropropyltridecaoxysilane and dimethoxymethyl-3,3,3-trifluoropropylsilane.

7. A refrigerator oil which comprises at least one of the fluorinated compounds defined in claim 1, as a main component mixed with a base oil.

8. A refrigerator oil which comprises 100 parts by weight of base oil and 0.0005 to 10 parts by weight of the fluorinated compound defined in claim 1.

9. The refrigerator oil as claimed in claim 8, wherein the base oil is mineral oil, synthetifc oil or mixture thereof having a kinematic viscosity at 40° C. of 5 to 1000 cSt.

* * * * *